United States Patent
Sunaga

(10) Patent No.: US 11,511,276 B2
(45) Date of Patent: Nov. 29, 2022

(54) LIQUID HANDLING DEVICE, LIQUID HANDLING SYSTEM AND LIQUID HANDLING METHOD

(71) Applicant: Enplas Corporation, Saitama (JP)

(72) Inventor: Nobuya Sunaga, Saitama (JP)

(73) Assignee: Enplas Corporation, Saitama (JP)

( * ) Notice: Subject to any disclaimer, the term of this patent is extended or adjusted under 35 U.S.C. 154(b) by 98 days.

(21) Appl. No.: 17/198,300

(22) Filed: Mar. 11, 2021

(65) Prior Publication Data

US 2021/0283603 A1   Sep. 16, 2021

(30) Foreign Application Priority Data

Mar. 13, 2020   (JP) .............................. JP2020-044100

(51) Int. Cl.
  *B01L 3/00* (2006.01)
  *G01N 35/08* (2006.01)

(52) U.S. Cl.
  CPC ..... *B01L 3/502715* (2013.01); *B01L 3/50273* (2013.01); *B01L 3/502738* (2013.01); *B01L 3/502784* (2013.01); *G01N 35/08* (2013.01); *B01L 2300/0816* (2013.01); *B01L 2300/0867* (2013.01); *B01L 2400/043* (2013.01)

(58) Field of Classification Search
  CPC .......... B01L 3/502715; B01L 3/50273; B01L 3/502738; B01L 3/502784; B01L 2300/0816; B01L 2300/0867; B01L 2400/043; B01L 2200/0668; B01L 2400/0487; B01L 2400/0638; B01L 3/502761; B01L 3/527; B01L 3/5025; B01L 2200/0636; B01L 2200/16; B01L 2300/0829; G01N 35/08; B01J 19/087; C12Q 1/6806
  See application file for complete search history.

(56) References Cited

U.S. PATENT DOCUMENTS

2016/0045918 A1   2/2016  Lapham et al.
2018/0326424 A1*  11/2018 Ririe .................... C12Q 1/6844

FOREIGN PATENT DOCUMENTS

JP         2018-054619        4/2018

* cited by examiner

*Primary Examiner* — Jennifer Wecker
*Assistant Examiner* — Oyeleye Alexander Alabi

(57) ABSTRACT

A liquid handling device includes a common channel, a plurality of wells, a magnetic beads chamber and a plurality of valves. The plurality of valves are rotary membrane valves disposed on the circumference of a first circle. The magnetic beads chamber is disposed on a circumference of the second circle concentric with the first circle.

7 Claims, 11 Drawing Sheets

LIQUID HANDLING DEVICE, LIQUID HANDLING SYSTEM AND LIQUID HANDLING METHOD

CROSS REFERENCE TO RELATED APPLICATIONS

This application is entitled to and claims the benefit of Japanese Patent Application No. 2020-044100, filed on Mar. 13, 2020, the disclosure of which including the specification, drawings and abstract is incorporated herein by reference in its entirety.

TECHNICAL FIELD

The present invention relates to a liquid handling device, a liquid handling system and a liquid handling method for processing liquid using magnetic beads.

BACKGROUND ART

In recent years, microwell plates, flow chips and the like have been used to analyze cells, proteins, and nucleic acids. Microwell plates and channel chips have the advantage of requiring only a small amount of reagents and samples for analysis, and are expected to be used in a variety of applications such as clinical tests, food tests and environment tests.

For example, PTL 1 discloses that, with a microwell plate (sample processing plate), DNA is extracted from a sample such as blood using magnetic beads. In PTL 1, with a magnetic-beads recirculation pump, slurry in which magnetic beads are dispersed is dispensed to a microwell plate using a fluid dispensing device. In addition, in the state where magnetic beads bound to a target molecule are held on the bottom of a well using a magnet, a suction device suctions the fluid in the well.

CITATION LIST

Patent Literature

PTL 1
Japanese Patent Application Laid-Open No. 2018-54619

SUMMARY OF INVENTION

Technical Problem

As disclosed in PTL 1, various processes such as extraction of DNA from a sample can be performed using magnetic beads. At the same time, however, when dedicated apparatuses such as a magnetic-beads recirculation pump and a suction device are used for respective processes as disclosed in PTL 1, the size of the apparatus is disadvantageously increased.

An object of the present invention is to provide a liquid handling device, a liquid handling system and a liquid handling method that can process liquid using magnetic beads without the need for large apparatuses.

Solution to Problem

A liquid handling device of an embodiment of the present invention is configured to process liquid using magnetic beads, the liquid handling device including: a common channel; a plurality of wells connected to the common channel; a magnetic beads chamber connected to the common channel and configured to process liquid using magnetic beads; and a plurality of valves disposed between the plurality of wells and the magnetic beads chamber, and the common channel. The plurality of valves are rotary membrane valves disposed on a circumference of a first circle. The magnetic beads chamber is disposed on a circumference of a second circle concentric with the first circle.

A liquid handling system of an embodiment of the present invention includes: the liquid handling device; and a rotary member configured to rotate around a central axis that passes through a center of the first circle and a center of the second circle. The rotary member includes: a protrusion configured to press a diaphragm of each of the plurality of valves, and a permanent magnet configured to attract magnetic beads in the magnetic beads chamber. In plan view, a length of the magnetic beads chamber in a direction along the circumference of the second circle is greater than a length of the permanent magnet in the direction along the circumference of the second circle.

A liquid handling method of an embodiment of the present invention is a method of processing liquid using the liquid handling system, the method including: introducing liquid to at least one of the plurality of wells; opening a valve corresponding to the well to which the liquid is introduced and a valve corresponding to the magnetic beads chamber by rotating the rotary member, the valve corresponding to the well to which the liquid is introduced being a valve of the plurality of valves, the valve corresponding to the magnetic beads chamber being a valve of the plurality of valves; moving the liquid from the well to which the liquid is introduced to the magnetic beads chamber in which magnetic beads are housed in a state where the valve corresponding to the well to which the liquid is introduced and the valve corresponding to the magnetic beads chamber are open; and changing a position of the permanent magnet with respect to the magnetic beads chamber by rotating the rotary member to mix the liquid and the magnetic beads in the magnetic beads chamber.

Advantageous Effects of Invention

According to the present invention, it is possible to provide a liquid handling device, a liquid handling system and a liquid handling method that can process liquid using magnetic beads without the need for large apparatuses.

DESCRIPTION OF EMBODIMENTS

An embodiment of the present invention is elaborated below with reference to the accompanying drawings.
Configurations of Liquid Handling System and Liquid Handling Device In the present embodiment, a liquid handling system and a liquid handling device configured to process liquid using magnetic beads are described. To be more specific, a liquid handling system and a liquid handling device configured to extract DNAs from liquid containing a sample such as blood through the use of magnetic beads that nonspecifically adsorb DNAs are described.

Figure 1A:
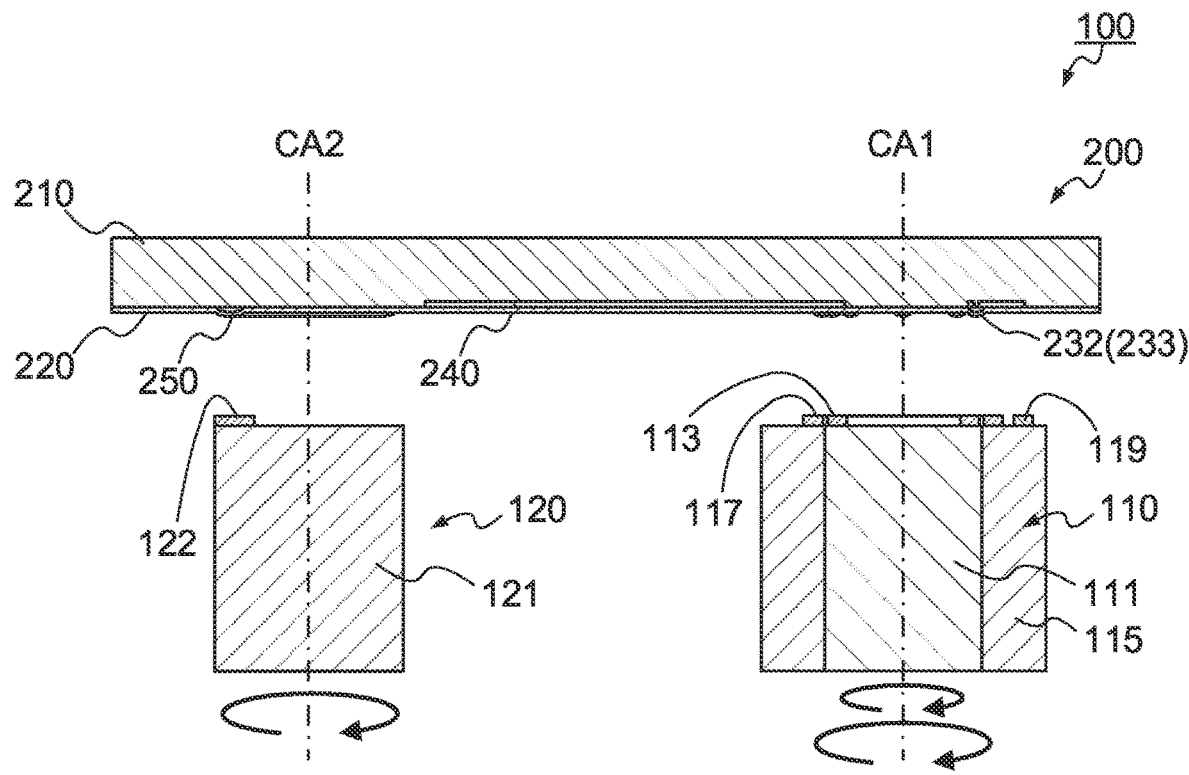
FIG. 1A is a sectional view illustrating a configuration of a liquid handling system according to an embodiment.
Figure 1B:
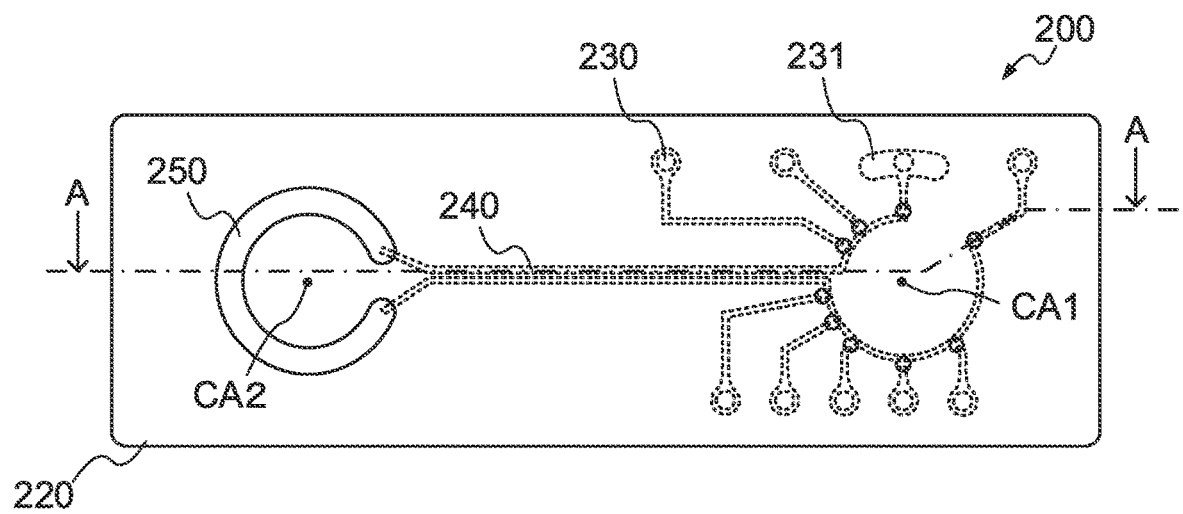
FIG. 1B is a bottom view of a liquid handling device according to the embodiment.

FIG. 1A is a sectional view illustrating a configuration of liquid handling system 100 according to the present embodiment. FIG. 1B is a bottom view of liquid handling device (channel chip) 200 according to the present embodiment. In FIG. 1B, inner channels and the like are illustrated with broken lines. The cross-section of liquid handling device 200 in FIG. 1A is a sectional view taken along line A-A of FIG. 1B.

As illustrated in FIG. 1A, liquid handling system 100 includes first rotary member 110, second rotary member 120 and liquid handling device (channel chip) 200. First rotary member 110 includes first inner rotary member 111 and first outer rotary member 115. First inner rotary member 111 and first outer rotary member 115 are rotated independently of each other about first central axis CA1 by an external driving mechanism not illustrated in the drawing. Second rotary member 120 is rotated around second central axis CA2 by an external driving mechanism not illustrated in the drawing. Liquid handling device 200 includes substrate 210 and film 220, and film 220 is installed such that film 220 makes contact with first rotary member 110 and second rotary member 120. Note that in FIG. 1A, for the purpose of clearly illustrating the configuration of liquid handling system 100, the components are separated from each other.

Figure 2A:
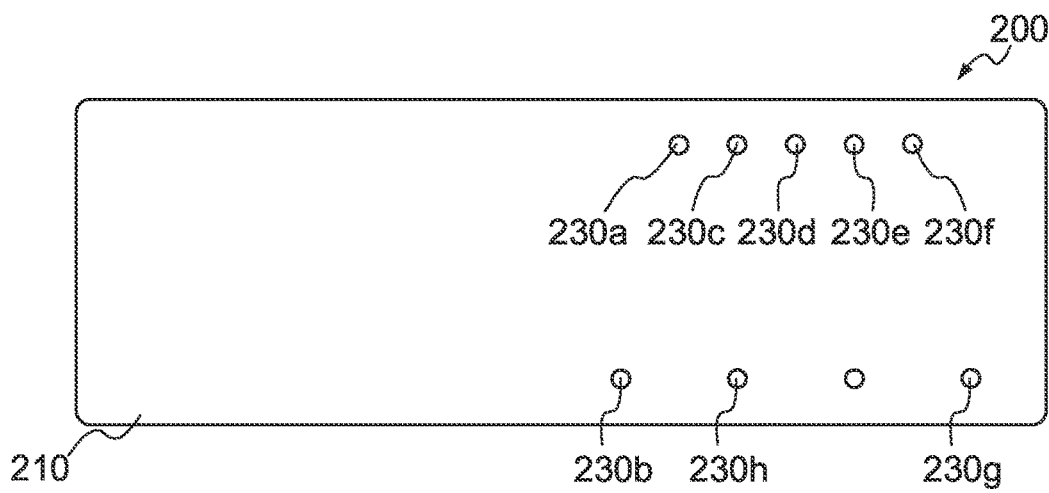
FIG. 2A is a plan view of the liquid handling device according to the embodiment.
Figure 2B:
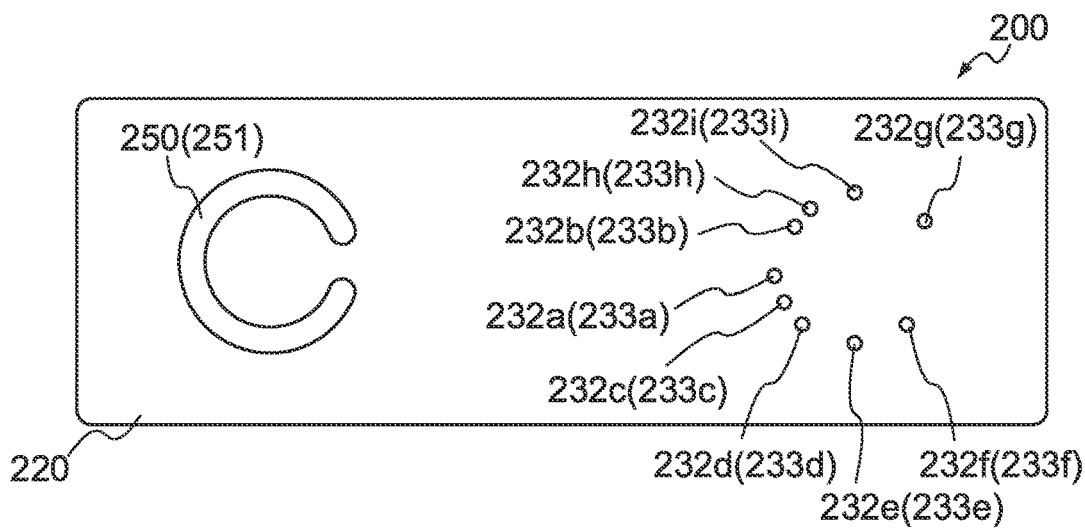
FIG. 2B is a bottom view of the liquid handling device.
Figure 2C:
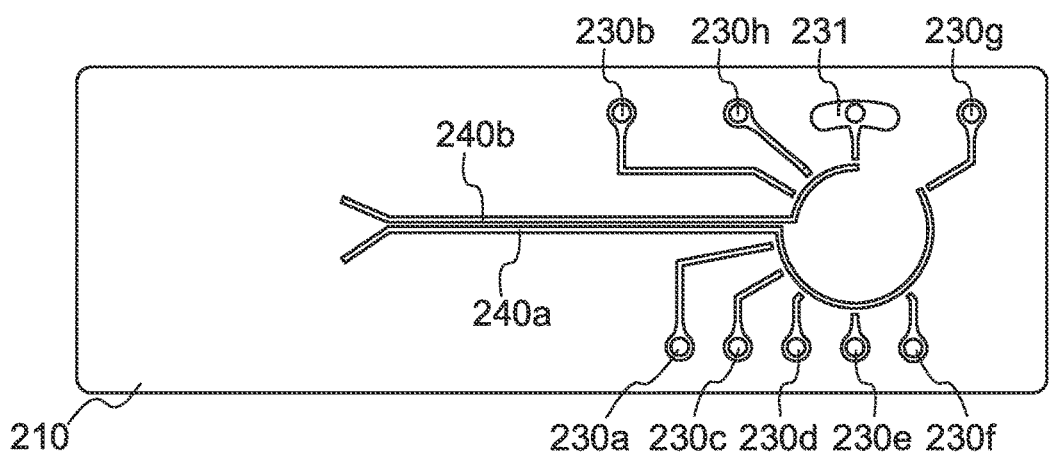
FIG. 2C is a bottom view of a substrate.
Figure 3:
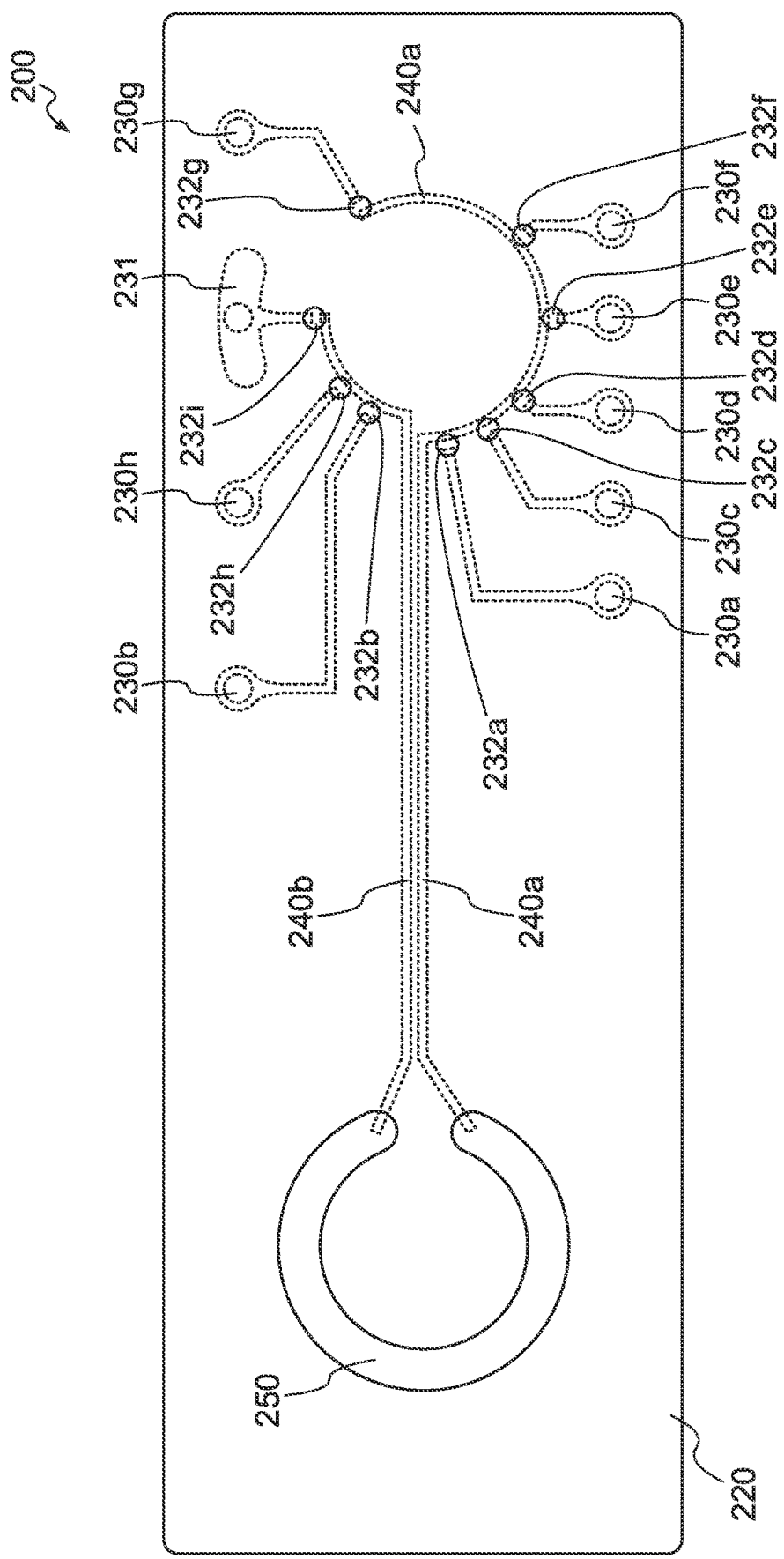
FIG. 3 is a bottom view for describing a configuration of the liquid handling device according to the embodiment.

FIGS. 2A to 3 are drawings illustrating a configuration of liquid handling device 200. FIG. 2A is a plan view of liquid handling device 200 (a plan view of substrate 210). FIG. 2B is a bottom view of liquid handling device 200 (a bottom view of film 220). FIG. 2C is a bottom view of substrate 210 (a bottom view of liquid handling device 200 with film 220 removed). FIG. 3 is a bottom view for describing a configuration of liquid handling device 200 (the same drawing as FIG. 1B). In FIG. 3, grooves (channels) and the like formed in the surface substrate 210 on film 220 side are illustrated with broken lines.

As described above, liquid handling device 200 includes substrate 210 and film 220 (see FIG. 1A). In substrate 210, grooves configured to be channels, recesses configured to be chambers, and through holes configured to be inlet ports or ejection ports are formed. Film 220 is joined to one surface of substrate 210 to close the openings of the recess and the through hole formed in substrate 210. A part of the region of film 220 functions as a diaphragm. The groove of substrate 210 closed with film 220 serves as a channel for carrying fluid such as reagent, liquid sample, washing solution, gas, and powder.

The thickness of substrate 210 is not limited. For example, substrate 210 has a thickness of 1 mm to 10 mm. In addition, the material of substrate 210 is not limited. For example, the material of substrate 210 may be appropriately selected from publicly known resins and glass. Examples of the material of substrate 210 include polyethylene terephthalate, polycarbonate, polymethylmethacrylate, polyvinyl chloride, polypropylene, polyether, polyethylene, polystyrene, cyclo-olefin resin, silicone resin and elastomer.

The thickness of film 220 is not limited as long as it can function as a diaphragm. For example, the thickness of film 220 is 30 μm to 300 μm. In addition, the material of film 220 is not limited as long as it can function as a diaphragm. For example, the material of film 220 may be appropriately selected from publicly known resins. Examples of the material of film 220 include polyethylene terephthalate, polycarbonate, polymethylmethacrylate, polyvinyl chloride, polypropylene, polyether, polyethylene, polystyrene, cyclo-olefin resin, silicone resin and elastomer. For example, film 220 is joined to substrate 210 by thermal welding, laser welding, an adhesive agent and the like.

Liquid handling device 200 includes common channel 240, a plurality of wells 230 connected to common channel 240, magnetic beads chamber 231 connected to common channel 240, and a plurality of valves 232 disposed between common channel 240, and the plurality of wells 230 and magnetic beads chamber 231. The numbers of wells 230 and valves 232 are not limited, and may be appropriately set in accordance with the use of liquid handling device 200. In addition, the type of the liquid to be housed in well 230 is not limited, and may be appropriately selected in accordance with the use of liquid handling device 200. The liquid is a reagent, a liquid sample, washing solution or the like.

In the present embodiment, as illustrated in FIG. 3, liquid handling device 200 includes, as the plurality of wells 230, sample well 230a, solution well 230b, first washing solution well 230c, second washing solution well 230d, third washing solution well 230e, fourth washing solution well 230f, eluate well 230g and effluent well 230h.

In addition, in the present embodiment, liquid handling device 200 includes common channel 240, first common channel 240a and second common channel 240b.

In addition, in the present embodiment, liquid handling device 200 includes, as the plurality of valves 232, valve 232a disposed between sample well 230a and common channel 240, valve 232b disposed between solution well 230b and common channel 240, valve 232c disposed between first washing solution well 230c and common channel 240, valve 232d disposed between second washing solution well 230d and common channel 240, valve 232e disposed between third washing solution well 230e and common channel 240, valve 232f disposed between fourth washing solution well 230f and common channel 240, valve 232g disposed between eluate well 230g and common channel 240, valve 232h disposed between effluent well 230h and common channel 240, and valve 232i disposed between magnetic beads chamber 231 and common channel 240.

In addition, in the present embodiment, liquid handling device 200 includes rotary membrane pump 250.

Sample well 230a is a bottomed recess to which a sample such as blood is introduced. Solution well 230b is a bottomed recess configured to house solution for lysing cells. Each of first washing solution well 230c, second washing solution well 230d, third washing solution well 230e and fourth washing solution well 230f is a bottomed recess configured to house washing solution for washing magnetic beads. Eluate well 230g is a bottomed recess in which an eluate for eluting DNAs bound to magnetic beads is housed. Effluent well 230i is a bottomed recess configured to house effluent. In the present embodiment, each of the recesses is composed of a through hole formed in substrate 210 and film 220 that closes one opening of the through hole. The shape and the size of each recess are not limited and may be appropriately set in accordance with the use. The shape of each recess is, for example, a substantially columnar shape. The width of each recess is, for example, approximately 2 mm.

Magnetic beads chamber 231 is a chamber configured to process liquid using magnetic beads. In the present embodiment, magnetic beads chamber 231 is used for mixing magnetic beads and a mixture of a sample and solution. Magnetic beads chamber 231 is composed of a recess formed in substrate 210 and film 220 that closes the opening of the recess. In the present embodiment, magnetic beads chamber 231 is connected to common channel 240 through a short channel, and valve 232h described later is disposed between that channel and common channel 240. In addition, in the present embodiment, magnetic beads chamber 231 is communicated with the outside through a through hole formed in substrate 210 as with other wells 230.

As described later, magnetic beads chamber 231 is disposed to be located on the circumference of second circle C2 centered on first central axis CA1 in such a manner that magnetic beads chamber 231 is along the movement path of permanent magnet 119 of first outer rotary member 115 that rotates about first central axis CA1 (see FIG. 6A). From the viewpoint of easily mixing liquid and magnetic beads by moving the magnetic beads when permanent magnet 119 is moved by rotating first outer rotary member 115, it is preferable that in plan view (bottom view), length L of magnetic beads chamber 231 in the direction along the circumference of second circle C2 centered on first central axis CA1 be greater than length (width) W of magnetic beads chamber 231 in the radial direction of second circle C2 (see FIG. 6A). In addition, it is preferable that in plan view (bottom view), length L of magnetic beads chamber 231 be greater than the length of permanent magnet 119 in the direction along the circumference of second circle C2 centered on first central axis CA1. In addition, it is preferable that in plan view (bottom view), width W of magnetic beads chamber 231 be equal to or smaller than the length (width) of permanent magnet 119 in the radial direction of second circle C2 centered on first central axis CA1 (see FIG. 6B). For example, L is approximately 7 mm, and W is approximately 2 mm. The shape of magnetic beads chamber 231 in plan view is not limited, but is preferably a shape along the circumference of second circle C2 from the viewpoint of easily moving magnetic beads. In the present embodiment, the shape of magnetic beads chamber 231 in plan view is a shape corresponding to a part of a ring centered on first central axis CA1. Each of the inner surface and the outer surface of magnetic beads chamber 231 is along the circumference of a circle centered on first central axis CA1.

While the depth of magnetic beads chamber 231 is not limited, the depth is preferably smaller than 20 times the mean particle diameter of the magnetic beads used, from the viewpoint of easily mixing liquid and magnetic beads. In addition, while the lower limit value of the depth of magnetic beads chamber 231 is not limited as long as magnetic beads can be housed, the lower limit value is, for example, more than twice the mean particle diameter of the magnetic beads used. While the mean particle diameter of the magnetic beads is not limited, the mean particle diameter of the magnetic beads is, for example approximately 3 μm.

First common channel 240a and second common channel 240b are channels in which fluid can move. The upstream end of first common channel 240a is connected to sample well 230a, first washing solution well 230c, second washing solution well 230d, third washing solution well 230e, fourth washing solution well 230f and eluate well 230g at respective positions different from each other. The downstream end of first common channel 240a is connected to rotary membrane pump 250. The upstream end of second common channel 240b is connected to rotary membrane pump 250. The downstream end of second common channel 240b is connected to solution well 230b, effluent well 230h and magnetic beads chamber 231 at respective positions different from each other.

In the present embodiment, each of the channels is composed of a groove formed in substrate 210 and film 220 that closes the opening of the groove. The cross-sectional area and the cross-sectional shape of each channel are not limited. The "cross-section of channel" as used herein means the cross-section of a channel orthogonal to the flow direction of the liquid. The cross-sectional shape of each channel is, for example, a substantially rectangular shape with each side (width and depth) having a length of approximately several tens of micrometers. The cross-sectional area of each channel may be or may not be constant in the flow direction of the fluid. In the present embodiment, the cross-sectional area of each channel is constant.

The plurality of valves 232 are membrane valves (diaphragm valves) disposed between common channel 240 and the plurality of wells 230 and magnetic beads chamber 231 and configured to control the flow of the fluid therebetween. In the present embodiment, these valves are rotary membrane valves whose opening and closing are controlled by rotation of first rotary member 110. In the present embodiment, these valves are disposed on the circumferences of two circles (an inner first circle and an outer first circle) centered on first central axis CA1.

In the present embodiment, valve 232a is disposed between sample well 230a and common channel 240. Valve 232b is disposed between solution well 230b and common channel 240. Valve 232c is disposed between first washing solution well 230c and common channel 240. Valve 232d is disposed between second washing solution well 230d and common channel 240. Valve 232e is disposed between third washing solution well 230e and common channel 240. Valve 232f is disposed between fourth washing solution well 230f and common channel 240. Valve 232g is disposed between eluate well 230g and common channel 240. Valve 232h is disposed between effluent well 230h and common channel 240. Valve 232i is disposed between magnetic beads chamber 231 and common channel 240.

Valve 232a includes a partition wall and diaphragm 233a. Likewise, valve 232b includes a partition wall and diaphragm 233b. Valve 232c includes a partition wall and diaphragm 233c. Valve 232d includes a partition wall and diaphragm 233d. Valve 232e includes a partition wall and diaphragm 233e. Valve 232f includes a partition wall and diaphragm 233f. Valve 232g includes a partition wall and diaphragm 233g. Valve 232h includes a partition wall and diaphragm 233h. Valve 232i includes a partition wall and diaphragm 233i.

The partition wall of valve 232a is disposed between sample well 230a and common channel 240. Diaphragm 233a of valve 232a is disposed opposite to the partition wall. Likewise, the partition wall of valve 232b is disposed between solution well 230b and common channel 240. Diaphragm 233b of valve 232b is disposed opposite to the partition wall. The partition wall of valve 232c is disposed between first washing solution well 230c and common channel 240. Diaphragm 233c of valve 232c is disposed opposite to the partition wall. The partition wall of valve 232d is disposed between second washing solution well 230d and common channel 240. Diaphragm 233d of valve 232d is disposed opposite to the partition wall. The partition wall of valve 232e is disposed between third washing solution well 230e and common channel 240. Diaphragm 233e of valve 232e is disposed opposite to the partition wall. The partition wall of valve 232f is disposed between fourth washing solution well 230f and common channel 240. Diaphragm 233f of valve 232f is disposed opposite to the partition wall. The partition wall of valve 232g is disposed between eluate well 230g and common channel 240. Diaphragm 233g of valve 232g is disposed opposite to the partition wall. The partition wall of valve 232h is disposed between effluent well 230h and common channel 240. Diaphragm 233h of valve 232h is disposed opposite to the partition wall. The partition wall of valve 232i is disposed between magnetic beads chamber 231 and common channel 240. Diaphragm 233i of valve 232i is disposed opposite to the partition wall.

The partition wall of valve 232a functions as a valve seat of a membrane valve (diaphragm valve) for opening and closing between sample well 230a and common channel 240. Likewise, the partition wall of valve 232b functions as a valve seat of a membrane valve for opening and closing between solution well 230b and common channel 240. The partition wall of valve 232c functions as a valve seat of a membrane valve for opening and closing between first washing solution well 230c and common channel 240. The partition wall of valve 232d functions as a valve seat of a membrane valve for opening and closing between second washing solution well 230d and common channel 240. The partition wall of valve 232e functions as a valve seat of a membrane valve for opening and closing between third washing solution well 230e and common channel 240. The partition wall of valve 232f functions as a valve seat of a membrane valve for opening and closing between fourth washing solution well 230f and common channel 240. The partition wall of valve 232g functions as a valve seat of a membrane valve for opening and closing between eluate well 230g and common channel 240. The partition wall of valve 232h functions as a valve seat of a membrane valve for opening and closing between effluent well 230h and common channel 240. The partition wall of valve 232i functions as a valve seat of a membrane valve for opening and closing between magnetic beads chamber 231 and common channel 240. The shape and the height of the partition walls are not limited as long as the above-mentioned functions can be ensured. The shape of each partition wall is, for example, a quadrangular prism shape. The height of each partition wall is, for example, the same as the depth of each channel.

Each of diaphragm 233a of valve 232a, diaphragm 233b of valve 232b, diaphragm 233c of valve 232c, diaphragm 233d of valve 232d, diaphragm 233e of valve 232e, diaphragm 233f of valve 232f, diaphragm 233g of valve 232g, diaphragm 233h of valve 232h, and diaphragm 233i of valve 232i is a part of flexible film 220, and has a substantially spherical cap shape (dome shape) (see FIG. 1A). Film 220 is disposed on substrate 210 such that each diaphragm faces the corresponding partition wall in a noncontact manner.

Figure 6A:
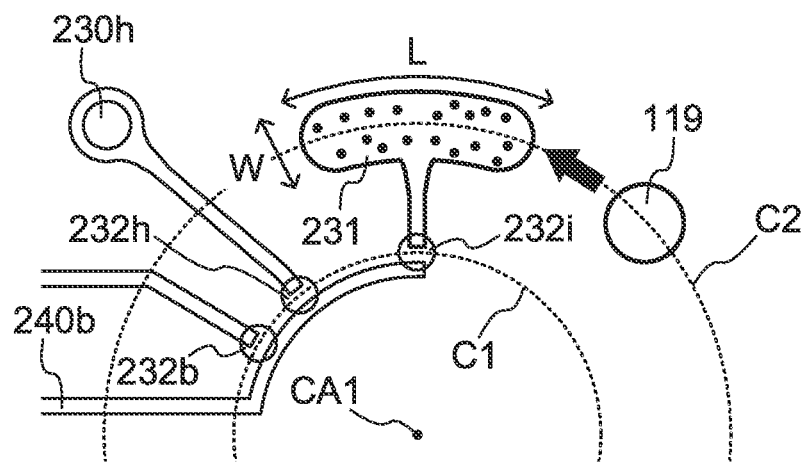
FIGS. 6A and 6B are schematic views for describing a relationship between a magnetic beads chamber and a permanent magnet.

Diaphragm 233b of valve 232b, diaphragm 233h of valve 232h, and diaphragm 233i of valve 232i are disposed on the circumference of inner first circle C1 centered on first central axis CA1 (see FIG. 6A). These diaphragms deflect toward the corresponding partition wall when pressed by first inner protrusion 113 (described later) of first inner rotary member 111. Diaphragm 233a of valve 232a, diaphragm 233c of valve 232c, diaphragm 233d of valve 232d, diaphragm 233e of valve 232e, diaphragm 233f of valve 232f, and diaphragm 233g of valve 232g are disposed on the circumference of the outer first circle centered on first central axis CA1. These diaphragms deflect toward the corresponding partition wall when pressed by first outer protrusion 117 (described later) of first outer rotary member 115. In this manner, the diaphragms function as valve elements of diaphragm valves. For example, when first inner protrusion 113 is not pressing diaphragm 233i of valve 232i, second common channel 240b and magnetic beads chamber 231 are communicated with each other through the gap of diaphragm 233i and the corresponding partition wall. On the other hand, when first inner protrusion 113 is pressing diaphragm 233i in such a manner that diaphragm 233i makes contact with the corresponding partition wall, second common channel 240b and magnetic beads chamber 231 are not communicated with each other.

Rotary membrane pump 250 is a space having a substantially arc-shape (C-shape) in plan view and is formed between substrate 210 and film 220. The upstream end of rotary membrane pump 250 is connected to first common channel 240a, and the downstream end of rotary membrane pump 250 is connected to second common channel 240b. In the present embodiment, rotary membrane pump 250 is composed of the bottom surface of substrate 210 and diaphragm 251 facing the bottom surface with a space therebetween. Diaphragm 251 is a part of flexible film 220 (see FIG. 1A). Diaphragm 251 is disposed on the circumference of one circle centered on second central axis CA2. The cross-sectional shape of diaphragm 251 in the direction orthogonal to the circumference is not limited, and is an arc-shape in the present embodiment.

Diaphragm 251 of rotary membrane pump 250 is deflected to make contact with substrate 210 when pressed by second protrusion 122 (described later) of second rotary member 120. For example, when second protrusion 122 presses diaphragm 251 while making sliding contact with it from the connecting part with first common channel 240a toward the connecting part with second common channel 240b (clockwise in FIG. 3), the fluid in first common channel 240a moves toward rotary membrane pump 250 so as to set the inside of first common channel 240a to a negative pressure and the fluid in rotary membrane pump 250 moves toward second common channel 240b so as to set the inside of second common channel 240b to a positive pressure. On the other hand, when second protrusion 122 presses diaphragm 251 while making sliding contact with it from the connecting part with second common channel 240b toward the connecting part with first common channel 240a (counterclockwise in FIG. 3), the fluid in second common channel 240b moves toward rotary membrane pump 250 so as to set the inside of second common channel 240b to a negative pressure, and the fluid in rotary membrane pump 250 moves toward first common channel 240a so as to set the inside of first common channel 240a to a positive pressure.

Figure 4A:
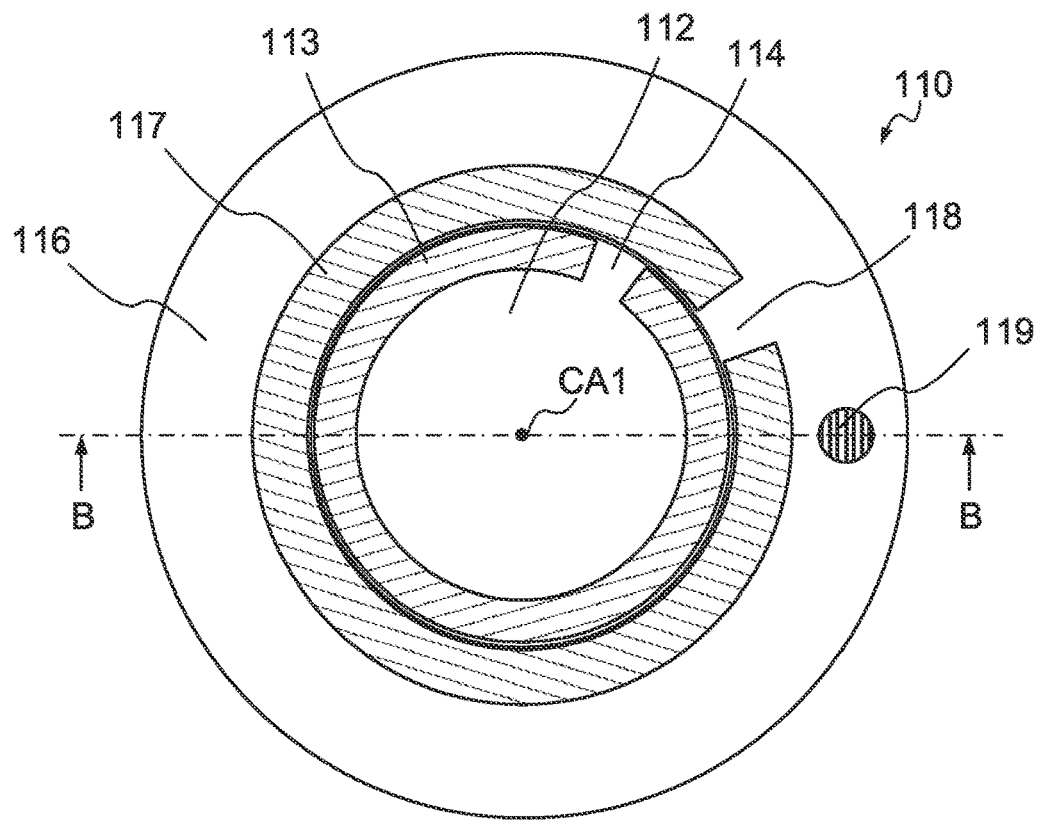
FIG. 4A is a plan view of a first rotary member.
Figure 4B:
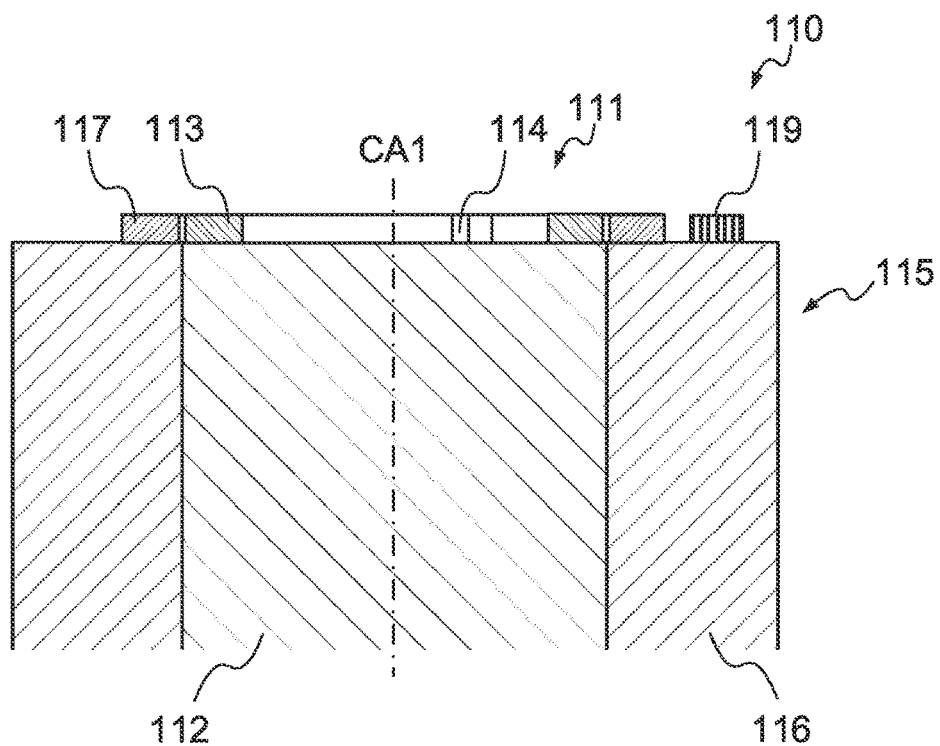
FIG. 4B is a sectional view taken along line B-B of FIG. 4A.

FIG. 4A is a plan view of first rotary member 110, and FIG. 4B is a sectional view taken along line B-B of FIG. 4A. In FIG. 4A, for the sake of clarity, the top surfaces of first inner protrusion 113, first outer protrusion 117 and permanent magnet 119 are hatched.

First rotary member 110 includes first inner rotary member 111 disposed inside and first outer rotary member 115 disposed outside.

First inner rotary member 111 includes columnar first inner body 112, first inner protrusion 113 disposed in the top surface of first inner body 112, and first inner recess 114 disposed in the top surface of first inner body 112. First inner body 112 is rotatable about first central axis CA1. First inner body 112 is rotated by the external driving mechanism not illustrated in the drawing.

In the upper part of first inner body 112, first inner protrusion 113 configured to close valve 232b, valve 232h and valve 232i by pressing diaphragm 233b, diaphragm 233h and diaphragm 233i, and first inner recess 114 configured to open the valves without pressing the diaphragms are provided. First inner protrusion 113 and first inner recess 114 are disposed on the circumference of a circle centered on first central axis CA1. In the present embodiment, the shape of first inner protrusion 113 in plan view is an arc-shape (C-shape) corresponding to a part of a circle centered on first central axis CA1. The region where first inner protrusion 113 is not provided on the circumference is first inner recess 114.

Note that it suffices that first inner protrusion 113 is relatively protruded than first inner recess 114, and that first inner recess 114 is relatively recessed than first inner protrusion 113. That is, it suffices that first inner protrusion 113 can function as a pressure part, and that first inner recess 114 can function as a non-pressure part. For example, in the example illustrated in FIG. 4B, first inner protrusion 113 is protruded from the top surface (reference surface) of first inner body 112, and the bottom surface of first inner recess 114 is a surface at the same height as the top surface (reference surface) of first inner body 112. Conversely, the top surface of first inner protrusion 113 may be a surface at the same height as the top surface (reference surface) of first inner body 112, and in that case, first inner recess 114 is recessed from the top surface (reference surface) of first inner body 112.

First outer rotary member 115 includes cylindrical first outer body 116, first outer protrusion 117 disposed in the top surface of first outer body 116, and first outer recess 118 disposed in the top surface of first outer body 116. First outer body 116 is rotatable about first central axis CA1 independently of first inner body 112. First outer body 116 is rotated by the external driving mechanism not illustrated in the drawing.

In the upper part of first outer body 116, first outer protrusion 117 configured to close valve 232a, valve 232c, valve 232d, valve 232e, valve 232f and valve 232g by pressing diaphragm 233a, diaphragm 233c, diaphragm 233d, diaphragm 233e, diaphragm 233f and diaphragm 233g, and first outer recess 118 configured to open the valves without pressing the diaphragms are provided. First outer protrusion 117 and first outer recess 118 are disposed on the circumference of a circle centered on first central axis CA1. In the present embodiment, the shape of first outer protrusion 117 in plan view is an arc-shape (C-shape) corresponding to a part of a circle centered on first central axis CA1. The region where first outer protrusion 117 is not provided on the circumference is first outer recess 118.

Note that it suffices that first outer protrusion 117 is relatively protruded than first outer recess 118 and that first outer recess 118 is relatively recessed than first outer protrusion 117. That is, it suffices that first outer protrusion 117 can function as a pressure part, and that first outer recess 118 can function as a non-pressure part. For example, in the example illustrated in FIG. 4B, first outer protrusion 117 is protruded from the top surface (reference surface) of first outer body 116, and the bottom surface of first outer recess 118 is a surface at the same height as the top surface (reference surface) of first outer body 116. Conversely, the top surface of first outer protrusion 117 may be a surface at the same height as the top surface (reference surface) of first outer body 116, and in that case, first outer recess 118 is recessed from the top surface (reference surface) of first outer body 116.

In addition, in the upper part of first outer body 116, permanent magnet 119 configured to attract magnetic beads in magnetic beads chamber 231 by applying a magnetic field to the inside of magnetic beads chamber 231 is disposed. The size and the shape of permanent magnet 119 are not limited. When liquid handling device 200 is disposed on first rotary member 110, permanent magnet 119 may make contact with liquid handling device 200, or may be spaced from liquid handling device 200. In addition, the position of permanent magnet 119 in first outer body 116 may be appropriately set in accordance with the positions of first outer protrusion 117 and first outer recess 118. In the present embodiment, permanent magnet 119 is disposed in the upper part of first outer body 116 such that first outer recess 118 is not located between first central axis CA1 and permanent magnet 119.

Figure 5A:
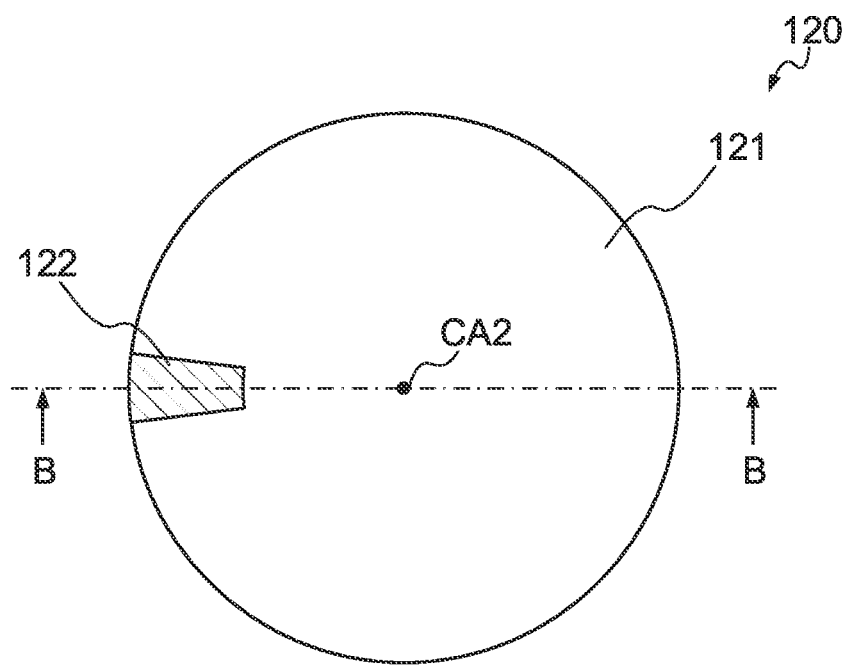
FIG. 5A is a plan view of a second rotary member.
Figure 5B:
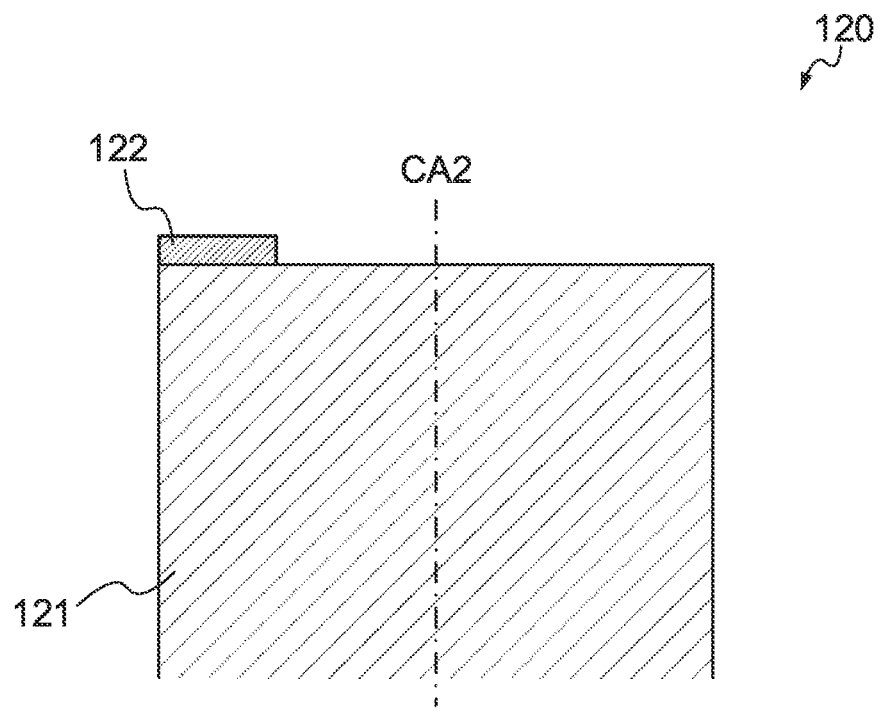
FIG. 5B is a sectional view taken along line B-B of FIG. 5A.

FIG. 5A is a plan view of second rotary member 120, and FIG. 5B is a sectional view taken along line B-B of FIG. 5A. In FIG. 5A, for the sake of clarity, the top surface of second protrusion 122 is hatched.

Second rotary member 120 includes columnar second body 121 and second protrusion 122 disposed on the top surface of second body 121. Second body 121 is rotatable about second central axis CA2. Second body 121 is rotated by the external driving mechanism not illustrated in the drawing.

In the upper part of second body 121, second protrusion 122 configured to operate rotary membrane pump 250 by pressing diaphragm 251 while making sliding contact with it is provided. Second protrusion 122 is disposed on the circumference of a circle centered on second central axis CA2. The shape of second protrusion 122 is not limited as long as rotary membrane pump 250 can be appropriately operated. In the present embodiment, the shape of second protrusion 122 in plan view is an arc-shape corresponding to a part of a circle centered on second central axis CA2.

As described above, in liquid handling system 100 according to the present embodiment, the protrusion of first rotary member 110 controls the opening and closing of the plurality of valves 232 of liquid handling device 200, and permanent magnet 119 of first rotary member 110 controls the position of the magnetic beads in magnetic beads chamber 231 of liquid handling device 200.

To achieve this configuration, the protrusion of first rotary member 110 and the plurality of valves 232 of liquid handling device 200 are disposed to be located on the circumference of a first circle centered on first central axis CA1. This first circle may be a single circle, or a plurality of concentric circles. In the present embodiment, the protrusion of first rotary member 110 and the plurality of valves 232 of liquid handling device 200 are disposed on the circumference of one of two circles, an inner first circle and an outer second circle. To be more specific, first inner protrusion 113 of first rotary member 110, and valve 232b, valve 232h and valve 232i of liquid handling device 200 are disposed on the circumference of inner first circle. First outer protrusion 117 of first rotary member 110 valve 232a, valve 232c, valve 232d, valve 232e, valve 232f and valve 232g of liquid handling device 200 are disposed on the circumference of the outer first circle.

In addition, permanent magnet 119 of first rotary member 110 and magnetic beads chamber 231 of liquid handling device 200 are disposed to be located on the circumference of the second circle centered on first central axis CA1. The first circle and the second circle are concentric circles. In the present embodiment, the second circle is disposed outside the first circle.

Figure 6B:
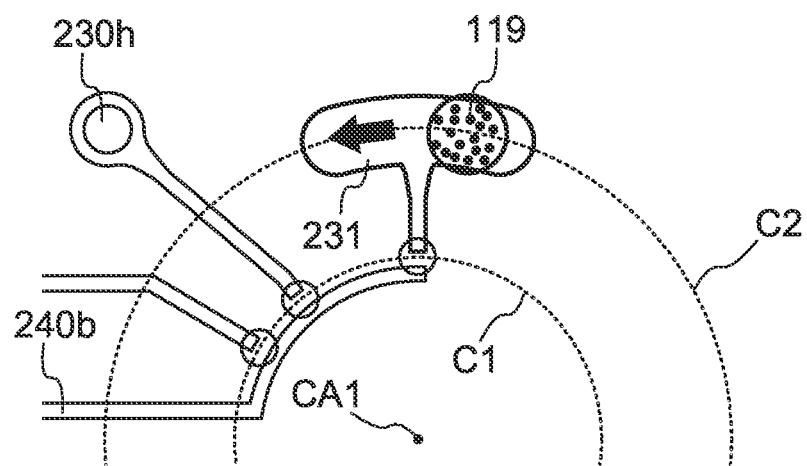

FIGS. 6A and 6B are schematic views for describing a relationship between magnetic beads chamber 231 and permanent magnet 119.

As illustrated in FIG. 6A, the protrusion (first inner protrusion 113 (omitted in FIG. 6A)) of first rotary member 110 and valve 232b, valve 232h and valve 232i of liquid handling device 200 are disposed on the circumference of first circle (inner first circle) C1 centered on first central axis CA1. In addition, permanent magnet 119 of first rotary member 110 and magnetic beads chamber 231 of liquid handling device 200 are disposed to be located on the circumference of second circle C2 centered on first central axis CA1.

As illustrated in FIG. 6A, when first rotary member 110 (first outer rotary member 115) is rotated in the state where magnetic beads are dispersed in magnetic beads chamber 231, permanent magnet 119 moves to a location immediately below magnetic beads chamber 231. In this manner, as illustrated in FIG. 6B, the magnetic beads are moved inside magnetic beads chamber 231 by being attracted to permanent magnet 119 in magnetic beads chamber 231. When first rotary member 110 (first outer rotary member 115) in this state is further rotated, the position of permanent magnet 119 with respect to magnetic beads chamber 231 is changed, and the position of the magnetic beads with respect to the liquid in magnetic beads chamber 231 is also changed. Thus, the mixing of the liquid and the magnetic beads in magnetic beads chamber 231 can be facilitated by controlling the rotation of first rotary member 110 (first outer rotary member 115) such that the position of permanent magnet 119 is changed in the vicinity of magnetic beads chamber 231.

Operations of Liquid Handling System and Liquid Handling Device

Next, with reference to FIGS. 7A to 11B, operations of liquid handling system 100 and liquid handling device 200 are described. For convenience of description, in FIGS. 7A to 11B, the plurality of valves 232 is illustrated with black circles when they are pressed and closed by first inner protrusion 113 or first outer protrusion 117 of first rotary member 110, and are illustrated with blank circles when they face first inner recess 114 or first outer recess 118 without being closed.

Figure 7A:
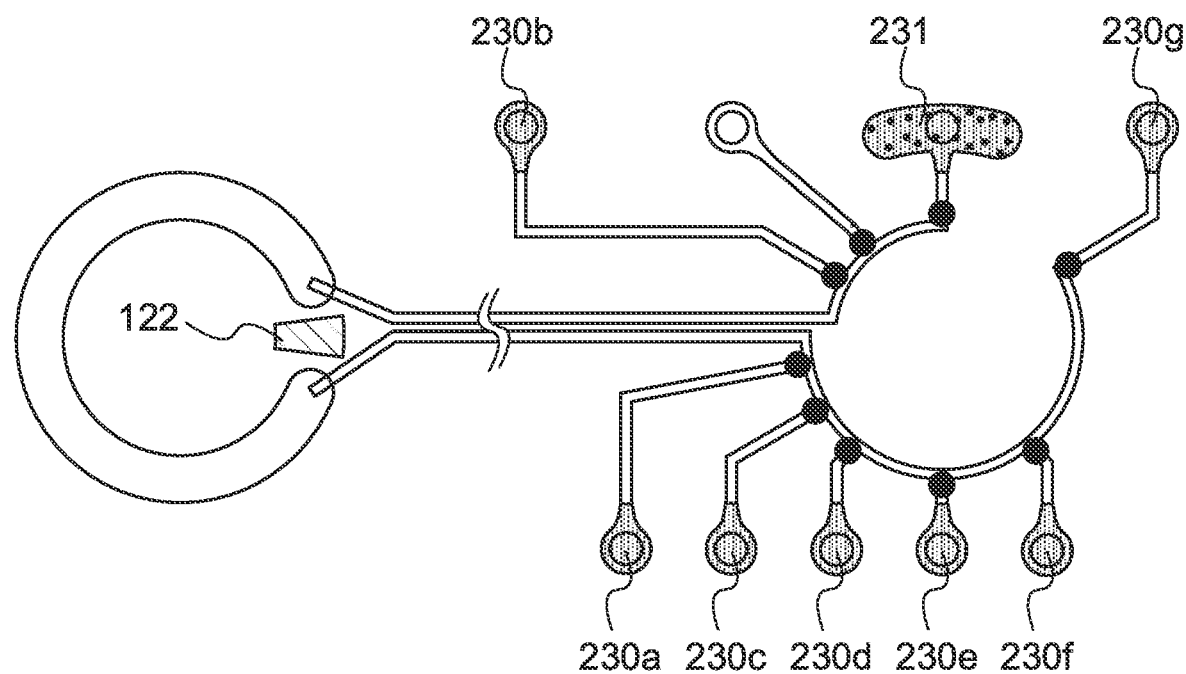
FIGS. 7A and 7B are schematic views for describing operations of the liquid handling system and the liquid handling device according to the embodiment.

First, as illustrated in FIG. 7A, a sample is introduced to sample well 230a, solution is introduced to solution well 230b, washing solution is introduced to first washing solution well 230c, second washing solution well 230d, third washing solution well 230e and fourth washing solution well 230f, eluate is introduced to eluate well 230g, and magnetic beads dispersion liquid is introduced to magnetic beads chamber 231. At this time, all valves 232 are closed.

Figure 7B:
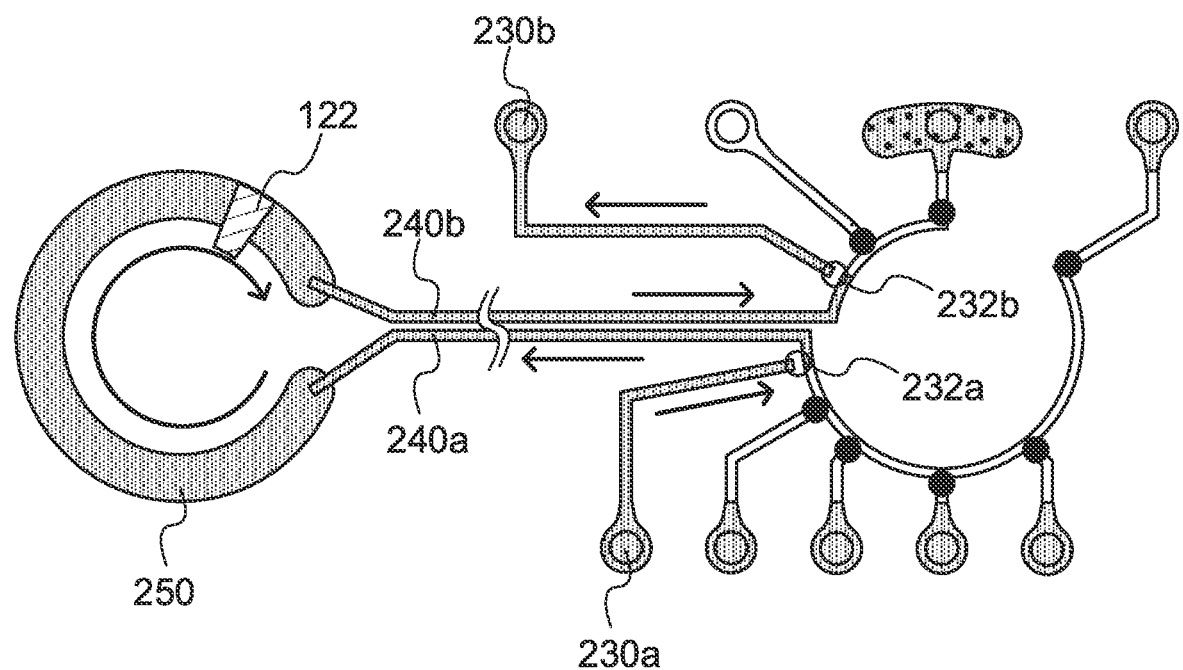

Next, as illustrated in FIG. 7B, first inner rotary member 111 and first outer rotary member 115 are rotated to open only valve 232a and valve 232b, and second rotary member 120 is rotated to move the sample in sample well 230a into solution well 230b through first common channel 240a, rotary membrane pump 250 and second common channel 240b. Thereafter, as necessary, second rotary member 120 is rotated while intermittently switching the rotational direction, and the sample and the solution in solution well 230b are mixed by moving them back and forth between solution well 230b and second common channel 240b. In the mixture, the cells contained in the sample are lysed and the DNA is released.

Figure 8A:
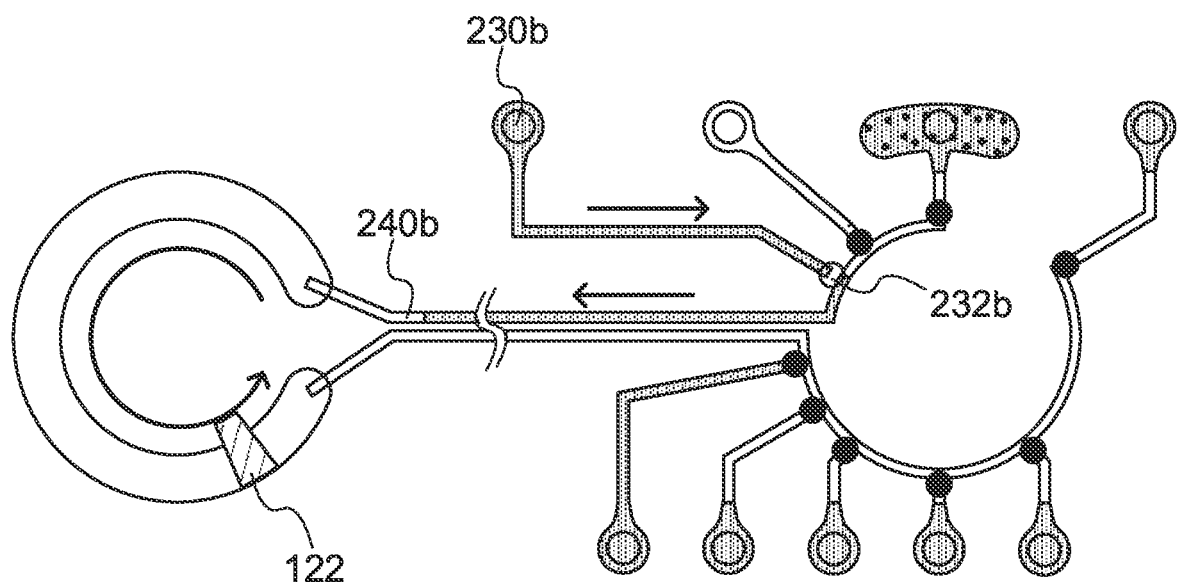
FIGS. 8A and 8B are schematic views for describing operations of the liquid handling system and the liquid handling device according to the embodiment.

Next, as illustrated in FIG. 8A, first inner rotary member 111 and first outer rotary member 115 are rotated to open only valve 232b, and second rotary member 120 is rotated to move the mixture in solution well 230b to second common channel 240b.

Figure 8B:
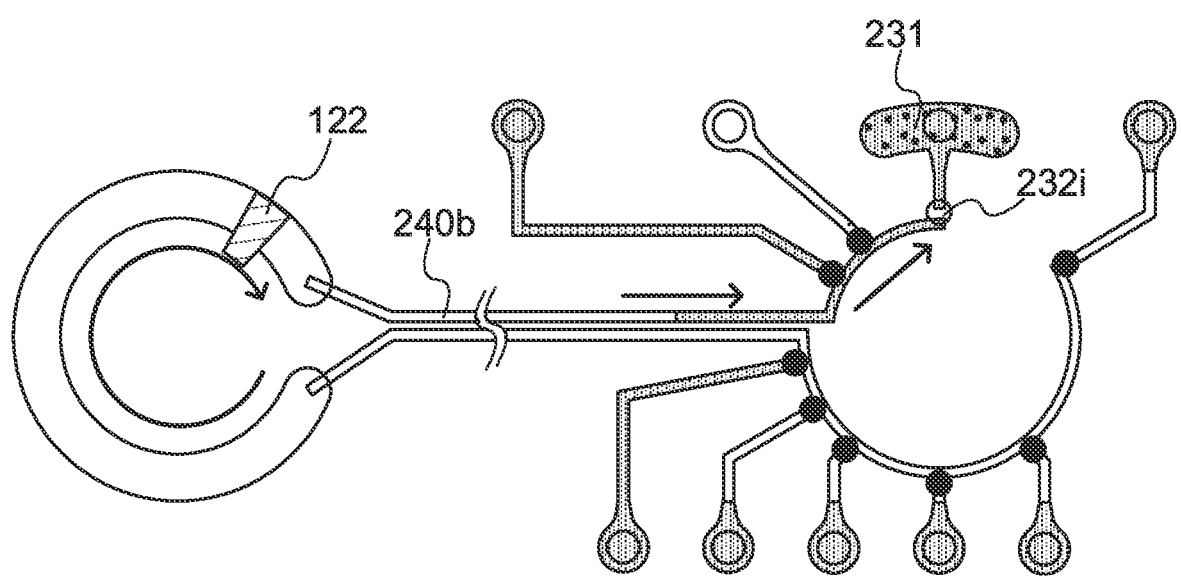

Next, as illustrated in FIG. 8B, first inner rotary member 111 and first outer rotary member 115 are rotated to open only valve 232i, and second rotary member 120 is rotated to move the mixture in second common channel 240b to magnetic beads chamber 231.

Figure 9A:
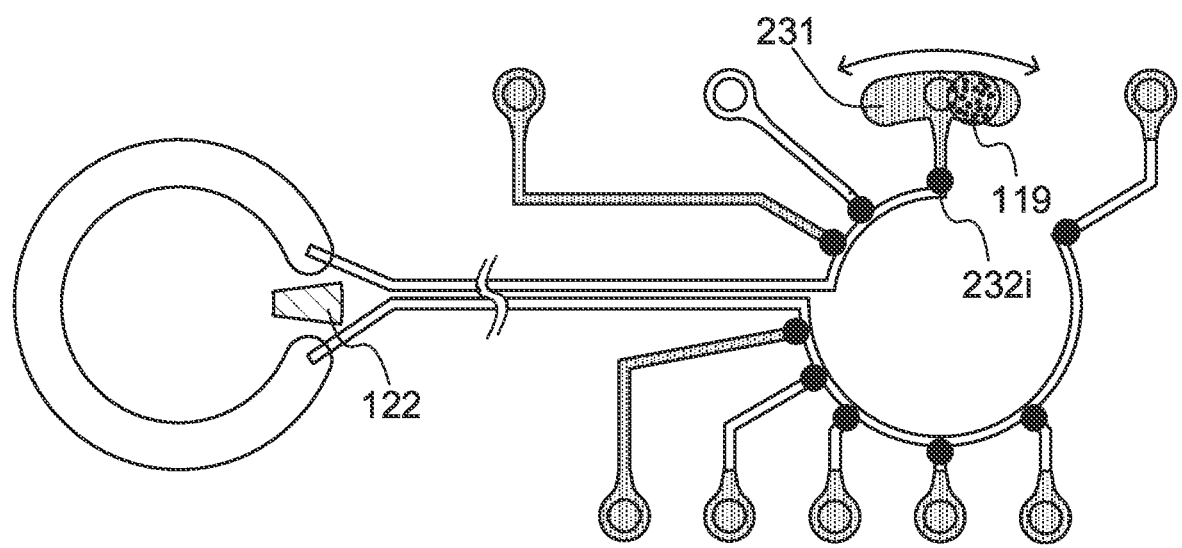
FIGS. 9A and 9B are schematic views for describing operations of the liquid handling system and the liquid handling device according to the embodiment.

Next, as illustrated in FIG. 9A, first inner rotary member 111 is rotated to close valve 232b, and first outer rotary member 115 is rotated to move permanent magnet 119 to the vicinity of magnetic beads chamber 231. Thereafter, first outer rotary member 115 is rotated while intermittently switching the rotational direction to move the magnetic beads back and forth in magnetic beads chamber 231, and mix the mixture and the magnetic beads in magnetic beads chamber 231. Since the magnetic beads are attracted by permanent magnet 119, the mixture in magnetic beads chamber 231 is separated into magnetic beads with adsorbed DNA and supernatant.

Figure 9B:
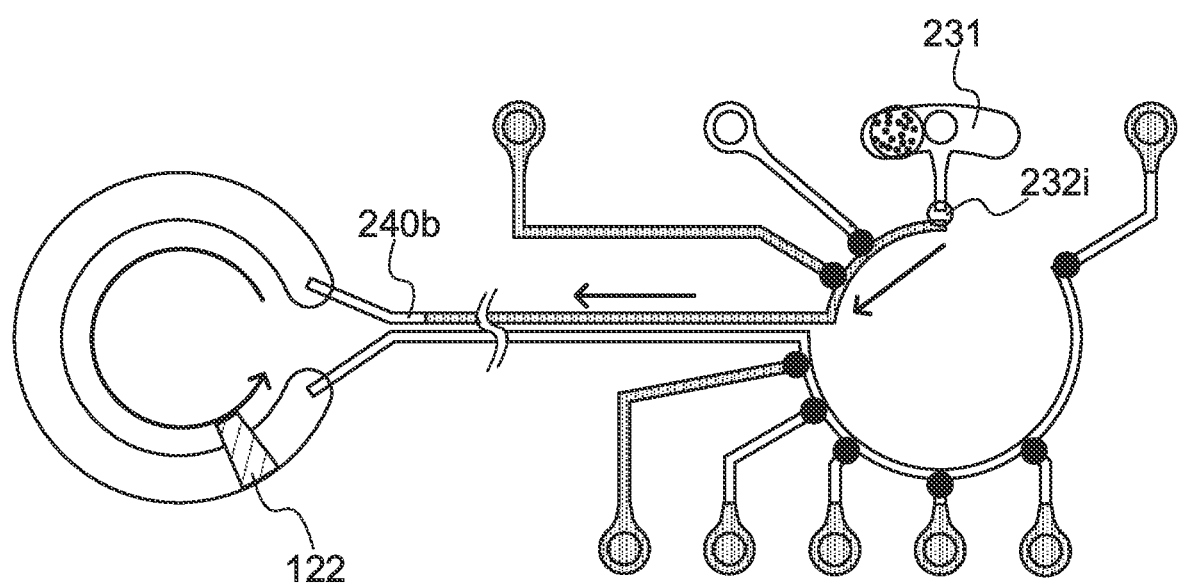

Next, as illustrated in FIG. 9B, first inner rotary member 111 and first outer rotary member 115 are rotated to open only valve 232i, and second rotary member 120 is rotated to move the supernatant in magnetic beads chamber 231 to second common channel 240b.

Figure 10A:
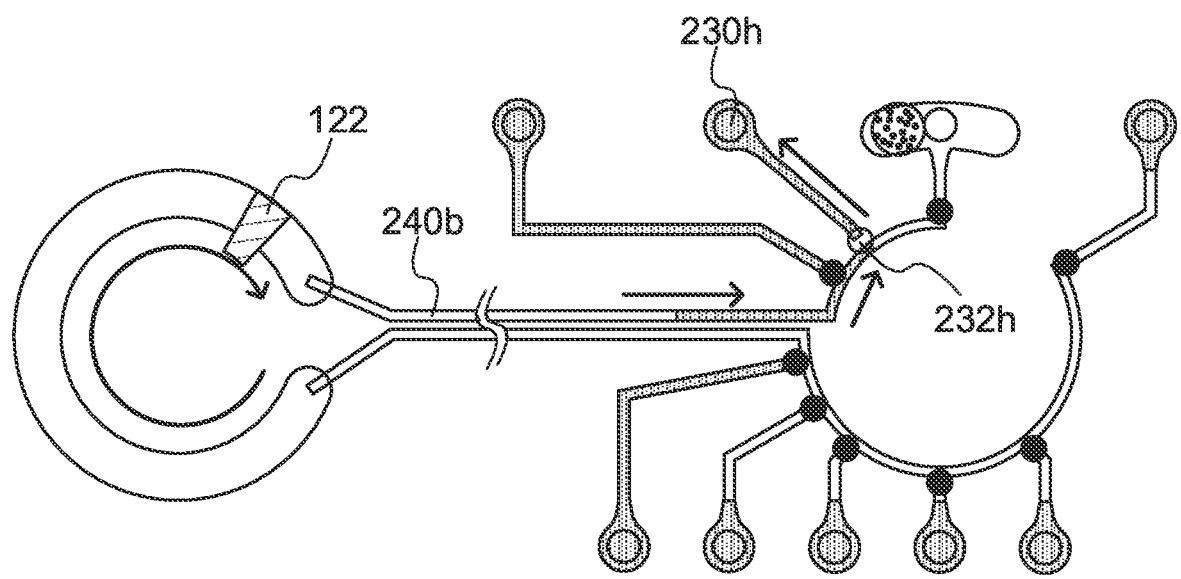
FIGS. 10A and 10B are schematic views for describing operations of the liquid handling system and the liquid handling device according to the embodiment.

Next, as illustrated in FIG. 10A, first inner rotary member 111 and first outer rotary member 115 are rotated to open only valve 232h, and second rotary member 120 is rotated to move the supernatant in second common channel 240b to effluent well 230h. Note that when the supernatant remains in magnetic beads chamber 231 even after single movement of the supernatant from magnetic beads chamber 231 to effluent well 230h, the movement of the supernatant from magnetic beads chamber 231 to effluent well 230h is repeated until the supernatant in magnetic beads chamber 231 is eliminated.

Figure 10B:
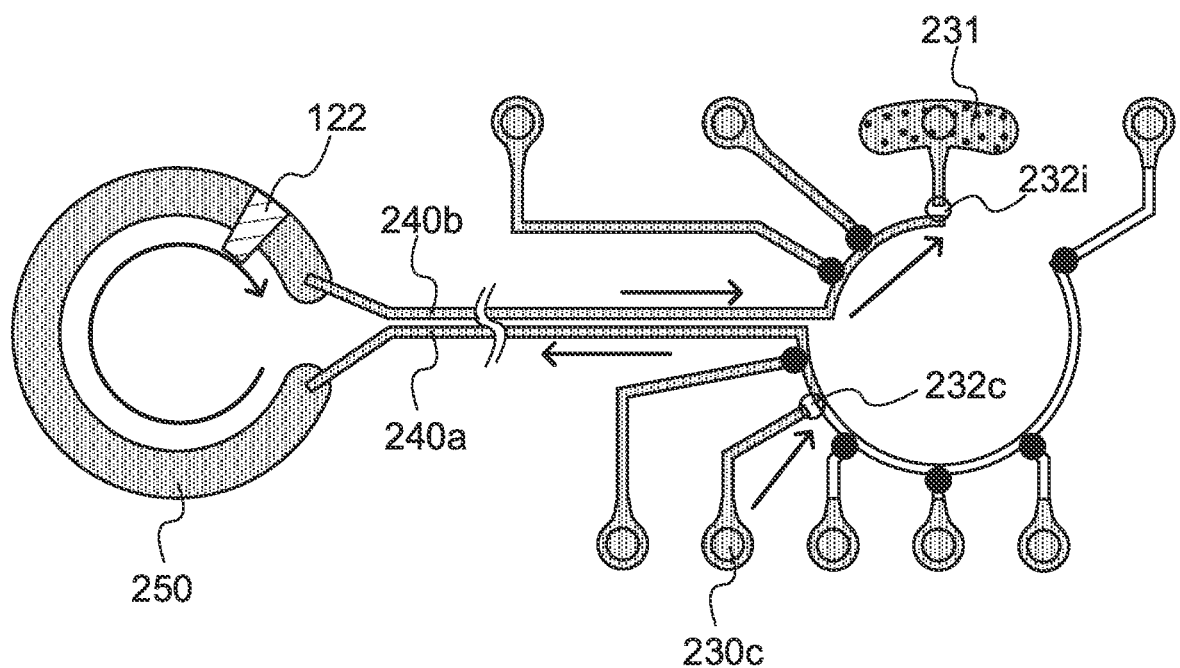
Figure 11A:
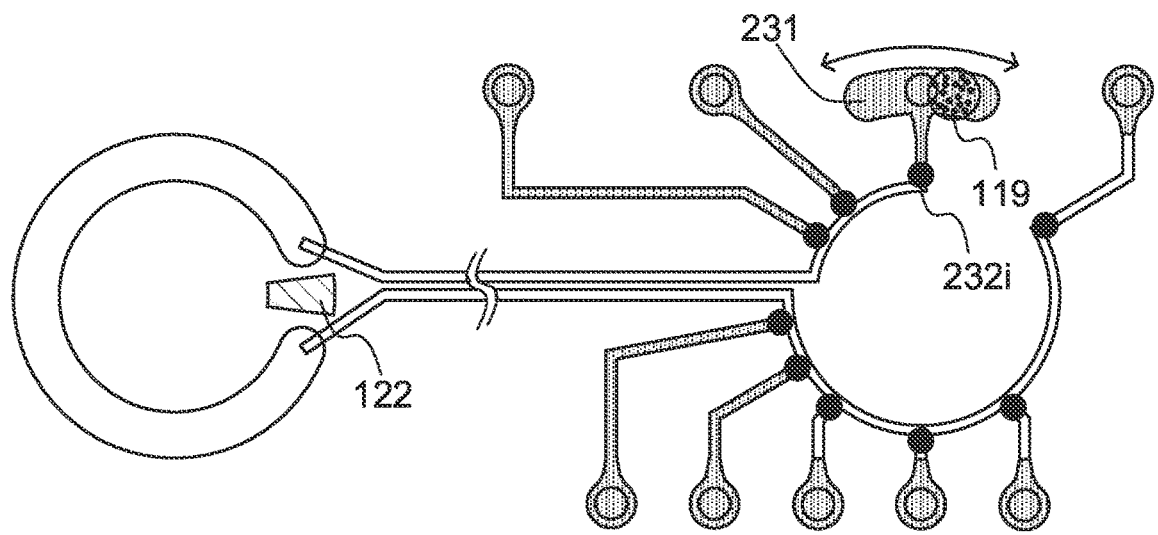
FIGS. 11A and 11B are schematic views for describing operations of the liquid handling system and the liquid handling device according to the embodiment.

Next, as illustrated in FIG. 10B, first inner rotary member 111 and first outer rotary member 115 are rotated to open only valve 232c and valve 232i, and second rotary member 120 is rotated to move the washing solution in first washing solution well 230c into magnetic beads chamber 231 through first common channel 240a, rotary membrane pump 250 and second common channel 240b. Thereafter, as illustrated in FIG. 11A, first outer rotary member 115 is rotated while intermittently switching the rotational direction to move the magnetic beads back and forth in magnetic beads chamber 231 and mix the washing solution and the magnetic beads in magnetic beads chamber 231. In this manner, the magnetic beads are washed.

Thereafter, first inner rotary member 111 and first outer rotary member 115 are rotated to open only valve 232*i*, and second rotary member 120 is rotated to move the washing solution in magnetic beads chamber 231 to second common channel 240*b* (omitted in the drawing; see FIG. 9B). Next, first inner rotary member 111 and first outer rotary member 115 are rotated to open only valve 232*h*, and second rotary member 120 is rotated to move the washing solution in second common channel 240*b* to effluent well 230*h* (omitted in the drawing; see FIG. 10A). Note that when the washing solution remains in magnetic beads chamber 231 even after single movement of the washing solution from magnetic beads chamber 231 to effluent well 230*h*, the movement of the washing solution from magnetic beads chamber 231 to effluent well 230*h* is repeated until the washing solution in magnetic beads chamber 231 is eliminated.

After washing of the magnetic beads with the washing solution in first washing solution well 230*c* is completed, washing of the magnetic beads with the washing solution in second washing solution well 230*d*, washing of the magnetic beads with the washing solution in third washing solution well 230*e*, and washing of the magnetic beads with the washing solution in fourth washing solution well 230*f* are sequentially performed through the same procedure (omitted in the drawing).

Figure 11B:
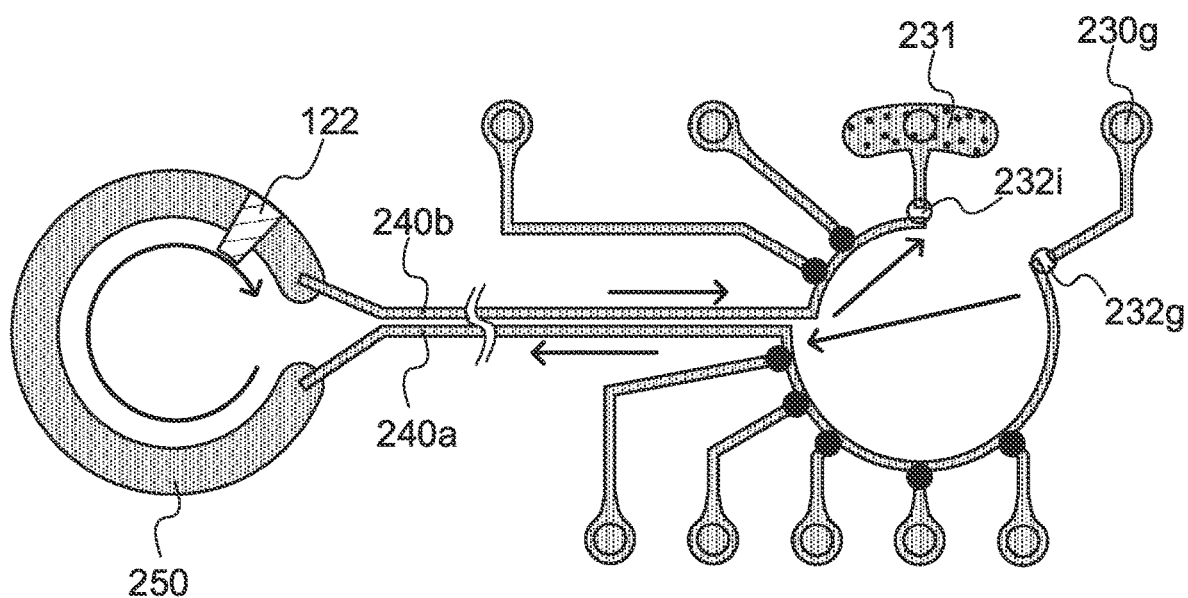

Finally, as illustrated in FIG. 11B, first inner rotary member 111 and first outer rotary member 115 are rotated to open only valve 232*g* and valve 232*i*, and second rotary member 120 is rotated to move the eluate in eluate well 230*g* into magnetic beads chamber 231 through first common channel 240*a*, rotary membrane pump 250 and second common channel 240*b*. Thereafter, first outer rotary member 115 is rotated while intermittently switching the rotational direction to move the magnetic beads back and forth in magnetic beads chamber 231 and mix the eluate and the magnetic beads in magnetic beads chamber 231 (omitted in the drawing; see FIG. 11A). In this manner, the DNA is released from the magnetic beads.

Through the above-mentioned procedure, liquid can be processed using magnetic beads, or more specifically, extracts of DNA can be prepared from a sample using magnetic beads.

Since the above-mentioned procedure uses permanent magnets instead of electromagnets, it is possible to simplify the configuration of first rotary member 110, and there is no generation of heat, which is a problem of the case where electromagnets are used. In addition, since magnetic beads and liquid can be mixed without pipetting, the liquid does not foam even if the liquid contains surfactants.

Effect

As described above, with liquid handling system 100 and liquid handling device 200 according to the present embodiment, liquid can be processed using magnetic beads without the need for large apparatuses.

Note that while an example of liquid handling device 200 including a rotary membrane pump is described in the present embodiment, the present invention is not limited to this. For example, each channel may be connected to a pump other than rotary membrane pump.

In addition, while an example of liquid handling device 200 that extracts DNA from a sample is described in the present embodiment, the application of liquid handling device 200 according to the embodiment of the present invention is not limited to this. For example, the liquid handling device is also applicable to sample preparation (amplification and modification of nucleic acids) for next-generation sequencers, and the like.

INDUSTRIAL APPLICABILITY

For example, the liquid handling device of the embodiment of the present invention is useful for various uses such as laboratory tests, food tests and environment tests.

REFERENCE SIGNS LIST

100 Liquid handling system
110 First rotary member
111 First inner rotary member
112 First inner body
113 First inner protrusion
114 First inner recess
115 First outer rotary member
116 First outer body
117 First outer protrusion
118 First outer recess
119 Permanent magnet
120 Second rotary member
121 Second body
122 Second protrusion
200 Liquid handling device
210 Substrate
220 Film
230 Well
231 Magnetic beads chamber
232 Valve
233 Diaphragm
240 Common channel
250 Rotary membrane pump
251 Diaphragm
C1 (Inner) First circle
C2 Second circle
CA1 First central axis
CA2 Second central axis

The invention claimed is:

1. A liquid handling device configured to process liquid using magnetic beads, the liquid handling device comprising:
 a common channel;
 a plurality of wells connected to the common channel;
 a magnetic beads chamber connected to the common channel and configured to process liquid using magnetic beads; and
 a plurality of valves disposed between the plurality of wells and the magnetic beads chamber, and the common channel,
 wherein the plurality of valves are rotary membrane valves disposed on a circumference of a first circle, and
 wherein the magnetic beads chamber is disposed on a circumference of a second circle concentric with the first circle.

2. The liquid handling device according to claim 1, wherein in plan view, a length of the magnetic beads chamber in a direction along the circumference of the second circle is greater than a length of the magnetic beads chamber in a radial direction of the second circle.

3. The liquid handling device according to claim 1, further comprising a rotary membrane pump connected to the common channel.

4. A liquid handling system, comprising:
 the liquid handling device according to claim 1; and a rotary member configured to rotate around a central axis that passes through a center of the first circle and a center of the second circle,
wherein the rotary member includes:
- a protrusion configured to press a diaphragm of each of the plurality of valves, and
- a permanent magnet configured to attract magnetic beads in the magnetic beads chamber, and wherein in plan view, a length of the magnetic beads chamber in a direction along the circumference of the second circle is greater than a length of the permanent magnet in the direction along the circumference of the second circle.

5. The liquid handling system according to claim 4, wherein in plan view, a length of the magnetic beads chamber in a radial direction of the second circle is equal to or smaller than a length of the permanent magnet in the radial direction of the second circle.

6. The liquid handling system according to claim 4, wherein a depth of the magnetic beads chamber is equal to or smaller than 20 times a mean particle diameter of the magnetic beads.

7. A liquid handling method of processing liquid using the liquid handling system according to claim 4, the method comprising:
- introducing liquid to at least one of the plurality of wells;
- opening a valve corresponding to the well to which the liquid is introduced and a valve corresponding to the magnetic beads chamber by rotating the rotary member, the valve corresponding to the well to which the liquid is introduced being a valve of the plurality of valves, the valve corresponding to the magnetic beads chamber being a valve of the plurality of valves;
- moving the liquid from the well to which the liquid is introduced to the magnetic beads chamber in which magnetic beads are housed in a state where the valve corresponding to the well to which the liquid is introduced and the valve corresponding to the magnetic beads chamber are open; and
- changing a position of the permanent magnet with respect to the magnetic beads chamber by rotating the rotary member to mix the liquid and the magnetic beads in the magnetic beads chamber.

* * * * *